June 2, 1925.
L. B. DOE
DRAFT MEANS
Filed Sept. 28, 1922
1,540,463
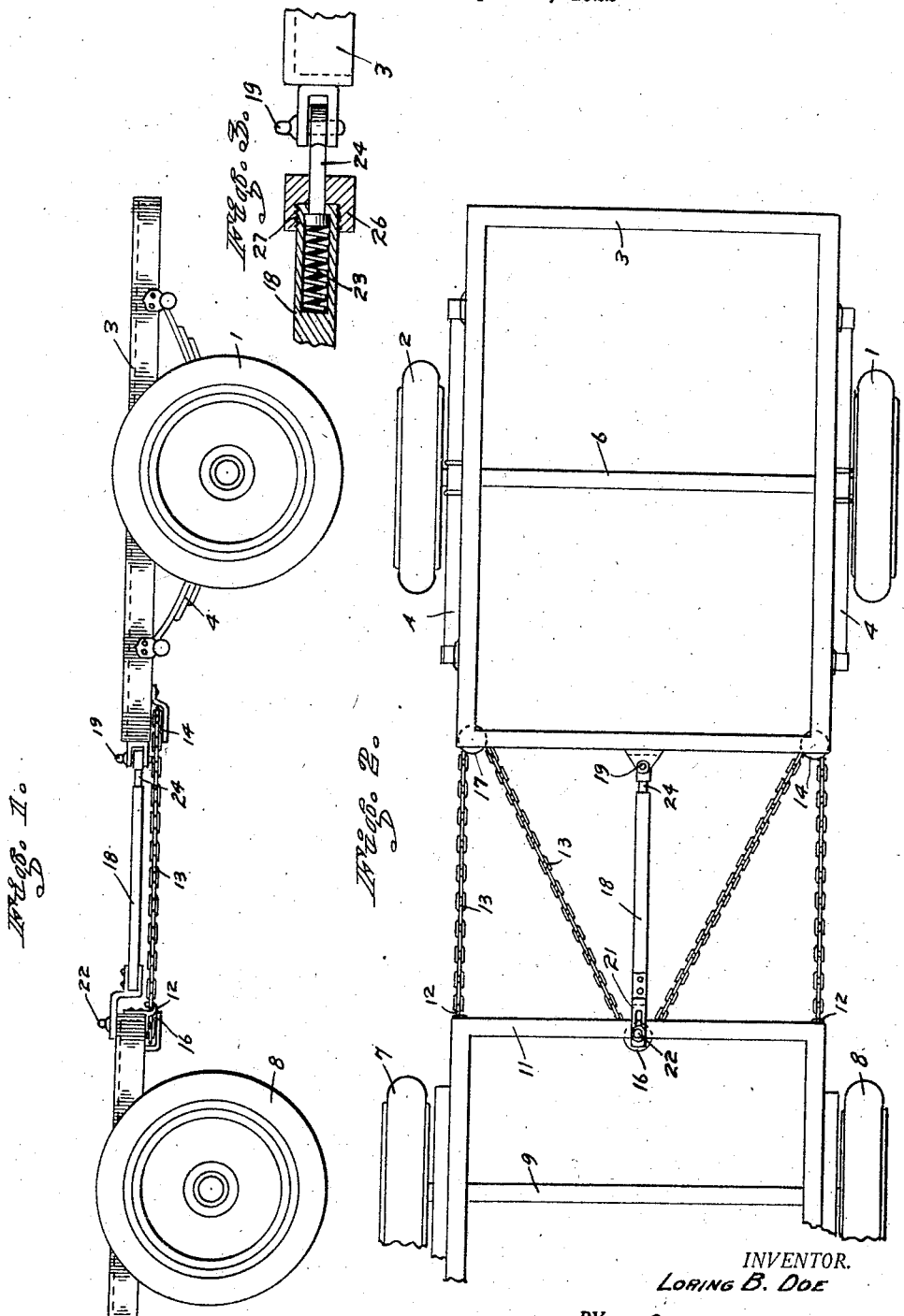
INVENTOR.
LORING B. DOE
BY Bradley L. Benson
ATTORNEY.

Patented June 2, 1925.

1,540,463

UNITED STATES PATENT OFFICE.

LORING B. DOE, OF SAN FRANCISCO, CALIFORNIA, ASSIGNOR TO WILLIAM H. METSON, OF SAN FRANCISCO, CALIFORNIA.

DRAFT MEANS.

Application filed September 28, 1922. Serial No. 591,171.

*To all whom it may concern:*

Be it known that I, LORING B. DOE, a citizen of the United States of America, residing at San Francisco, California, in the county of San Francisco and State of California, have invented certain new and useful Improvements in Draft Means, of which the following is a specification.

The present invention is an improved draft means and is an improvement on a device disclosed in United States Patent Number 1,391,101, issued to me on September 20, 1921.

The objects of this invention include the provision of a draft means comprising a flexible member, such as a cable or chain, connecting a trailer with a tractive vehicle in such a manner that portions of said flexible member will exert pulling force in directions oblique to the line of travel, and in such a manner that the flexible member will not cross itself and thereby be subjected to undue wear.

In the device referred to in my prior patent, the flexible member 13 crosses itself, as shown in Fig. 3 of the drawings of said Letters Patent and, under certain working conditions, inequality of road surface causes a distortion of the plane upon which the device operates and this causes friction at the point of contact where the chain crosses.

In the device hereinafter described, means are shown with which I can accomplish the desired result (the maintenance, under stress of travel, of a center pull throughout the train of vehicles) and eliminate entirely the crossing of the chain and the wear and friction incident thereto.

While the invention is here shown in the form considered to be the best, it is not limited to such form because it may be embodied in other forms, and it is to be understood that, in the following specification and the annexed claims, it is desired to cover the invention in whatever form it may be embodied.

In the accompanying one sheet of drawings,

Fig. 1 is a side elevation of a trailer and a fragment of a tractive vehicle showing my device interposed therebetween.

Fig. 2 is a top plan view of Fig. 1, and

Fig. 3 is a fragmentary detail on an enlarged scale showing a compressible spacer bar.

Referring to the drawings, the numerals 1 and 2 indicate the supporting wheels of a trailer, the frame 3 of which is supported on springs 4 secured to an axle 6.

Similar wheels 7 and 8 on an axle 9 support a frame 11 of a tractive vehicle. The frame 11 is provided with hooks 12 for engaging links of a chain 13.

One end of the chain 13 is secured to one of the hooks 12 and the chain is then reeved through a sheave 14 rotatively mounted on the frame 3 of the adjacent vehicle, thence through a sheave 16 on the frame 11, thence through a sheave 17 on the frame 3, and the free end of the chain 13 is engaged with the other of the hooks 12. It will be seen that, by this zig-zag method of reeving, the chain 13 will, throughout certain portions of its length, exert pulling force in direction oblique to the line of travel or draft, and that these portions offset or balance each other to effect stability and obviate side sway in travel.

Obviously, other zig-zag forms of reeving than that shown in the drawings might be employed with good results, and any zig-zag form of the flexible member 13 in which said member does not cross itself and in which it can contract on one side to compensate for expansion on the other while under strain will come within the scope of the present invention.

At 18 I show a hollow spacer bar member adapted to spread the vehicles apart as, for instance, while they are running down grade to preserve the proper relative positions of the vehicles of the train. As the bar 18 is in no sense a draft bar, I provide a pivotal connection, as shown by the pin 19, with one vehicle, and a slotted end portion 21 for yieldable pivotal engagement with the other vehicle. A pin 22, carried by the frame 11, extends through the slot in the member 21. This slot is of sufficient length to permit a degree of adjustment of the distance between the vehicles by shortening the chain 13 as, for instance, by engaging links remote from the end of the chain with one of the hooks 12.

In Fig. 3, at 23, I show a spring in a hollow portion of the bar 18. One end of this spring bears against the bar 18 and the other end against the head of an eye bolt 24. The parts are held in assembled position by a cap member 26, threaded as indicated at 27 for engagement with the bar 18. This structure provides means for compressing the bar 18 and resilient means for keeping the chain 13 taut.

I may provide sheaves in lieu of the hooks 12, and carry the chain 13 over these sheaves and connect the two ends of the chain in such a manner that the chain will be endless and will not at any point cross itself.

I claim:

1. A draft means for connecting a drawn vehicle to a tractive vehicle comprising sheaves rotatively mounted on adjacent parts of said vehicles and a flexible member secured at each end to one of said vehicles and reeved zig-zag through said sheaves, alternating from a sheave on one vehicle to a sheave on the adjacent vehicle.

2. A trailer hitch for interposition between two vehicles comprising a flexible member, means for securing one end of said member to one of said vehicles, sheaves rotatively mounted on adjacent parts of said vehicles in staggered relation whereby the said flexible member may be reeved from said secured end successively through said sheaves, alternately from a sheave on one of said vehicles to a sheave on the adjacent vehicle, and means for securing the other end of said flexible member to one of said vehicles.

In testimony whereof I affix my signature.

LORING B. DOE.